United States Patent Office 3,558,681
Patented Jan. 26, 1971

3,558,681
METHOD FOR THE PRODUCTION OF METHYL-PHENYLCYCLOTRI- AND TETRASILOXANES
Alexandra Grigorievna Kuznetsova, 3 Vladimirskaya ul. 3, kv. 48; Sergei Alexandrovich Golubtsov, 3 Vladimirskaya ul. 4a, kv. 89; and Vladimir Ivanovich Ivanov, Leninsky prospekt 103, korp. 169, kv. 41, all of Moscow, U.S.S.R.
No Drawing. Filed Dec. 18, 1968, Ser. No. 784,907
Int. Cl. C07f 7/08
U.S. Cl. 260—448.2       2 Claims

ABSTRACT OF THE DISCLOSURE

A method of producing methylphenylcyclotri- and tetrasiloxanes characterized in that methylphenyldichlorosilane or methylphenyldialkoxysilane is subjected to hydrolytic condensation followed by thermal degradation of the formed methylphenylsiloxane oligomers in the presence of lithium hydroxide or lithium silanolate.

This invention relates to methods for the production of methylphenylcyclotri- and tetrasiloxanes, which can be employed for synthesis of various products such as rubbers, sealing compounds and linear oligomers. Said compounds can also be employed as heat carriers, fluids for diffusion pumps, etc.

Methods of producing methylphenycyclotri- and tetrasiloxanes are known wherein methylphenyldichlorosilane in the presence of sulphuric ether, or methylphenyldialkoxysilane are subjected to hydrolytic condensation followed by thermal degradation of the methylphenylsiloxane oligomers thus formed.

The yield of methylphenylcyclotrisiloxane is ~25% of theory, and the yield of methylphenyltetrasiloxane ~50% of theory.

Deficiencies of said known are the low yield of final products, the impossibility of converting the final products one into the other, the necessity of employing flammable solvents in a number of cases and likewise the necessity of employing initial methylphenylsilane monomers of high purity.

It is an object of the present invention to eliminate the above deficiencies.

It is a further and more specific object of the invention to provide a method of producing methylphenylcyclotri- and tetrasiloxanes whereby the final products are obtained in aggregate quantitative yield in any desired proportion and whereby the employment of flammable solvents is obviated and the initial methylphenylsilane monomers employed may be of technical grade (90-95%) as well as highly pure (99.8%).

It has been found that the foregoing objects may be realized by the provision of a method for the production of methylphenylcyclotri- and tetrasiloxanes involving the hydrolytic condensation of methylphenyldichlorosilane or methylphenyldialkoxysilane followed by thermal degradation of the methylphenylsiloxane oligomers formed, wherein, according to the invention, the operation of thermal degradation is carried out in the presence of lithium hydroxide or lithium silanolate.

Utilization of said compounds of lithium as catalysts in thermal degradation makes it possible to establish an equilibrium in this reaction and shift it in the desired direction for quantitative formation of one or the other methylphenylcyclosiloxane.

Lithium hydroxide is preferably taken in the amount of 0.01-1% of the methylphenylsiloxane oligomers by weight, and lithium silanolate in the amount of 1-10%.

For a better understanding of the present invention the following examples of the production of methylphenyl- cyclotri- and tetrasiloxanes are given by way of illustration.

EXAMPLE 1

A flask is charged with 1528 g. of water after which 764 g. of technical (96%) methylphenyldichlorosilane are added with vigorous stirring. The organic layer which forms, comprising a mixture of methylphenylsiloxane oligomers, is separated in a separatory funnel, washed with water and dried over calcium chloride. The yield of methylphenylsiloxane oligomers is 494 g. (94% of theory).

Into a flask connected with a fractionating column are placed 450 g. the methylphenylsiloxane oligomers obtained and 50 g. of lithium silanolate and the mixture is heated to 250° C. under vacuum (1-2 mm. of mercury), resulting in the formation and distillation of methylphenylcyclotrisiloxane. The yield of final product is 436 g. (96.8% of theory).

Found: Si, 20.56%; $R_D$=0.2821; mol. wt.=403. Calculated for $(CH_3C_6H_5SiO)_3$: Si, 20.63%; $R_D$=0.2826; mol. wt.=408.

EXAMPLE 2

A flask is charged with 1164 g. of water, after which 573 g. of technical (94%) methylphenyldichlorosilane are added with vigorous stirring. The organic layer which forms, comprising a mixture of methylphenylsiloxane oligomers, is separated in a separatory funnel, washed with water and dried over calcium chloride. The yield of methylphenylsiloxane oligomers is 365 g. (95% of theory).

Into a flask connected with a fractionating column are placed a solution of 350 g. of the methylphenylsiloxane oligomers obtained in 200 ml. of toluene and 0.35 g. of lithium hydroxide and the mixture heated to 220° C., thus distilling off the solvent. The vacuum is then turned on and the mixture is heated to 250° C. at a pressure of 1-2 mm. of mercury, distilling off the methylphenylcyclotrisiloxane formed. The yield of final product is 332 g. (94.7% of theory).

Found: Si, 20.51%; $R_D$=0.2820; mol. wt.=404. Calculated for $(CH_3C_6H_5SiO)_3$: Si=20.63%; $R_D$=0.2826; mol. wt.=408.

EXAMPLE 3

A flask is charged with 210 g. of technical (95%) methylphenyldiethoxysilane, after which 420 g. of 10% hydrochloric acid are added at a temperature of 80-100° C. with vigorous stirring. After stirring for 3 hrs. the organic layer, comprising a mixture of methylphenylsiloxane oligomers, is separated, washed with water and dried over calcium chloride. The yield of methylphenylsiloxane oligomers is 125 g. (93% of theory).

Into a flask connected with a fractionating column are placed 112 g. of the methylphenylsiloxane oligomers obtained and 12.5 g. of lithium silanolate and the mixture is heated to 250° under vacuum (1-2 mm. of mercury), resulting in the formation and distillation of methylphenylcyclotrisiloxane. The yield of final product is 104 g. (93% of theory).

Found: Si, 20.60%; $R_D$=0.2822; mol. wt.=405. Calculated for $(CH_3C_6H_5SiO)_3$: Si, 20.63%; $R_D$=0.2826; mol. wt.=408.

EXAMPLE 4

A flask is charged with 3820 g. of water, after which 1910 g. of technical (93%) methylphenyldichlorosilane are added with vigorous stirring. The organic layer which forms, comprising a mixture of methylphenylsiloxane oligomers, is separated, washed with water and dried over calcium chloride. The yield of methylphenylsiloxane oligomers is 1220 g. (96% of theory).

Into a Claisen flask are placed a solution of 1000 g. of the methylphenylsiloxane oligomers obtained in 600 ml. of toluene and 1.5 g. of lithium hydroxide and the mixture is heated to 220° C., thus distilling off the solvent. The vacuum is then turned on and heating continued under pressure of 3–5 mm. of mercury, raising the temperature to 360° and distilling off the mixture of methylphenylcyclotri- and tetrasiloxanes. The distillate totals 96.5% of the weight of the methylphenylsiloxane oligomers charged.

The mixture of methylphenylcyclotri- and tetrasiloxanes is placed in a Favorsky flask and fractionated, collecting the methylphenylcyclotrisiloxane fraction (325 g.) boiling at 168–200° C. (1 mm.) and the methylphenylcyclotetrasiloxane fraction (575 g.) boiling at 230–245° C. (1 mm.). The residue (50 g.) and the methylphenylcyclotrisiloxane are added to the residue in the Claisen flask, which contains the catalyst, and the mixture is heated to 250° C. The vacuum is then turned on and heating continued under pressure of 3–5 mm. of mercury, raising the temperature to 360° and distilling off the mixture of methylphenylcyclotri- and tetrasiloxanes. This mixture is fractionated in a Favorsky flask collecting the methylphenylcyclotri- and tetrasiloxane fractions as before. The residue and the methylphenylcyclotrisiloxane are again returned to the Claisen flask.

This procedure is repeated until the complete conversion of the methylphenylsiloxane oligomers into methylphenylcyclotetrasiloxane has been effected. Yield of final product 886 g. (88.6% of theory).

Found: Si, 20.71%; $n_D^{20}$ 1.5460; mol. wt. 538. Calculated for $(CH_3C_6H_5SiO)_4$: Si, 20.63%; mol. wt. 544. In the literature $n_D^{20}=1.5461$ (J. Am. Chem. Soc. 70, 1115, 1948).

EXAMPLE 5

Into a flask connected with a fractionating column are placed 450 g. of methylphenylcyclotetrasiloxane and 50 g. of lithium silanolate and the mixture is heated to 250° C. under pressure of 1–2 mm. of mercury, distilling off the methylphenylcyclotrisiloxane formed. The yield is 435 g. (97% of theory).

Found: Si, 20.52%; $R_D$ 0.2818; mol. wt. 402. Calculated for $(CH_3C_6H_5SiO)_3$: Si, 20.63%; $R_D$ 0.2826; mol. wt. 408.

EXAMPLE 6

Into the Claisen flask are placed 1500 g. of methylphenylcyclotrisiloxane and 100 g. of lithium silanolate and the mixture is heated to 250° C. The vacuum is then turned on and heating continued under pressure of 1–2 mm. of mercury, raising the temperature to 360° C. and distillating off a mixture of methylphenylcyclotri- and tetrasiloxanes. The distillate is transferred to a Favorsky flask and conversion to methylphenylcyclotetrasiloxane carried out as described in Example 4.

The yield of methylphenylcyclotetrasiloxane is 1360 g. (91.6% of theory).

Found: Si, 20.58%; $n_D^{20}$ 1.5462; mol. wt. 546. Calculated for $(CH_3C_6H_5SiO)_4$: Si, 20.63%; mol. wt. 544.

Though the present invention has been described in connection with the preferred embodiment thereof, it is obvious, that various changes and modifications can be resorted to without departing from the spirit and scope of the invention, as those skilled in the art will easily understand. These changes and modifications are to be considered as falling within the true spirit and scope of the invention as defined in the appended claims.

We claim:
1. A method of producing methylphenylcyclotri- and tetrasiloxanes which comprises subjecting to hydrolytic condensation a methylphenylsilane monomer chosen from the class consisting of methylphenyldichlorosilane and methylphenyldialkoxysilane and effecting thermal degradation of the methylphenylsiloxane oligomers formed, said thermal degradation being carried out in the presence of a catalyst chosen from the class consisting of lithium hydroxide and lithium silanolate.

2. A method as defined in claim 1, wherein lithium hydroxide is taken in the amount of 0.01–1% wt. percent of said methylphenylsiloxane oligomers and lithium silanolate is taken in the amount of 1–10 wt. percent of said methylphenylsiloxane oligomers.

References Cited

UNITED STATES PATENTS

| | | | |
|---|---|---|---|
| 3,337,497 | 8/1967 | Bostick | 260—448.2X |
| 3,453,304 | 7/1969 | Selin | 260—448.2(E) |
| 3,453,305 | 7/1969 | Selin | 260—448.2(E) |

TOBIAS E. LEVOW, Primary Examiner

P. F. SHAVER, Assistant Examiner